(12) United States Patent
Moribe et al.

(10) Patent No.: US 8,155,556 B2
(45) Date of Patent: Apr. 10, 2012

(54) IMAGE FORMING APPARATUS HAVING TWO FRONT CURVED PLANES ONE HAVING RADIUS CURVATURE LARGER THAN THE OTHER

(75) Inventors: Masato Moribe, Inazawa (JP); Satoru Hattori, Nagoya (JP); Keiichiro Egami, Nagoya (JP); Yosuke Mase, Aichi (JP); Susumu Misu, Kuwana (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 1256 days.

(21) Appl. No.: 11/844,732

(22) Filed: Aug. 24, 2007

(65) Prior Publication Data

US 2008/0049260 A1 Feb. 28, 2008

(30) Foreign Application Priority Data

Aug. 24, 2006 (JP) .................................. 2006-227951

(51) Int. Cl.
  *G03G 15/00* (2006.01)
(52) U.S. Cl. ......................................... 399/107; D18/50
(58) Field of Classification Search .................. 399/107, 399/90; D18/36, 50
  See application file for complete search history.

(56) References Cited

U.S. PATENT DOCUMENTS

| | | | |
|---|---|---|---|
| D458,297 S * | 6/2002 | Laidlaw et al. | ................ D18/36 |
| 6,690,901 B2 | 2/2004 | Katsuyama et al. | |
| D548,776 S * | 8/2007 | Egami et al. | ................... D18/50 |
| 7,266,325 B2 * | 9/2007 | Hirose et al. | ................... 399/107 |
| 7,302,204 B2 | 11/2007 | Katsuyama et al. | |
| 7,302,223 B2 | 11/2007 | Kawashima | |
| 7,024,129 B2 | 1/2008 | Ishii et al. | |
| 7,319,839 B2 | 1/2008 | Ishii | |
| 7,469,981 B2 | 12/2008 | Katsuyama et al. | |
| 7,577,389 B2 | 8/2009 | Ishii et al. | |
| 7,668,500 B2 | 2/2010 | Kawashima | |
| 2002/0150403 A1 | 10/2002 | Katsuyama et al. | |
| 2004/0114958 A1 | 6/2004 | Katsuyama et al. | |
| 2005/0019054 A1 * | 1/2005 | Ueda | ............................... 399/90 |
| 2005/0117942 A1 | 6/2005 | Ishii et al. | |
| 2005/0141936 A1 | 6/2005 | Kawashima | |
| 2005/0175372 A1 * | 8/2005 | Kunugi | ........................ 399/107 |

(Continued)

FOREIGN PATENT DOCUMENTS

JP 05-224474 A 9/1993

(Continued)

OTHER PUBLICATIONS

JP Office Action dtd Jun. 7, 2011, JP Appln. No. 2006-227951, partial English translation.

*Primary Examiner* — Sophia S Chen

(74) *Attorney, Agent, or Firm* — Banner & Witcoff, Ltd.

(57) ABSTRACT

An image forming apparatus includes: a printer unit that forms an image on a recording sheet; an operation panel for operating and/or setting the printer unit, a side on which the operation panel is provided is defined as a front side; and an ejection space on which the recording sheet ejected from the printer unit is placed. As viewed from the front side, a radius curvature of a first portion that intermediates a right side plane of the printer unit and a front plane of the printer unit is larger than a radius curvature of a second portion that intermediates a left side plane of the printer unit and the front plane of the printer unit.

14 Claims, 9 Drawing Sheets

U.S. PATENT DOCUMENTS

| | | |
|---|---|---|
| 2006/0008292 A1 | 1/2006 | Watanabe |
| 2006/0023005 A1 | 2/2006 | Katsuyama et al. |
| 2006/0083542 A1* | 4/2006 | Ito .................................. 399/107 |
| 2008/0044210 A1 | 2/2008 | Kawashima |
| 2008/0080911 A1 | 4/2008 | Ishii et al. |
| 2009/0074494 A1 | 3/2009 | Katsuyama et al. |

FOREIGN PATENT DOCUMENTS

| | | |
|---|---|---|
| JP | 11199120 | 7/1999 |
| JP | 20000155452 | 6/2000 |
| JP | 2003-197168 A | 7/2003 |
| JP | 2004-010333 A | 1/2004 |
| JP | 2004046246 | 2/2004 |
| JP | 2004212494 | 7/2004 |
| JP | 2004-230880 A | 8/2004 |
| JP | 2004-318179 A | 11/2004 |
| JP | 2005-187190 A | 7/2005 |
| JP | 2005-258025 A | 9/2005 |
| JP | 2005234222 | 9/2005 |
| JP | 2006-023347 A | 1/2006 |
| JP | 2006-117382 A | 5/2006 |
| JP | 2006-167077 A | 6/2006 |
| JP | 2006-171031 A | 6/2006 |
| JP | 2006-195000 A | 7/2006 |

\* cited by examiner

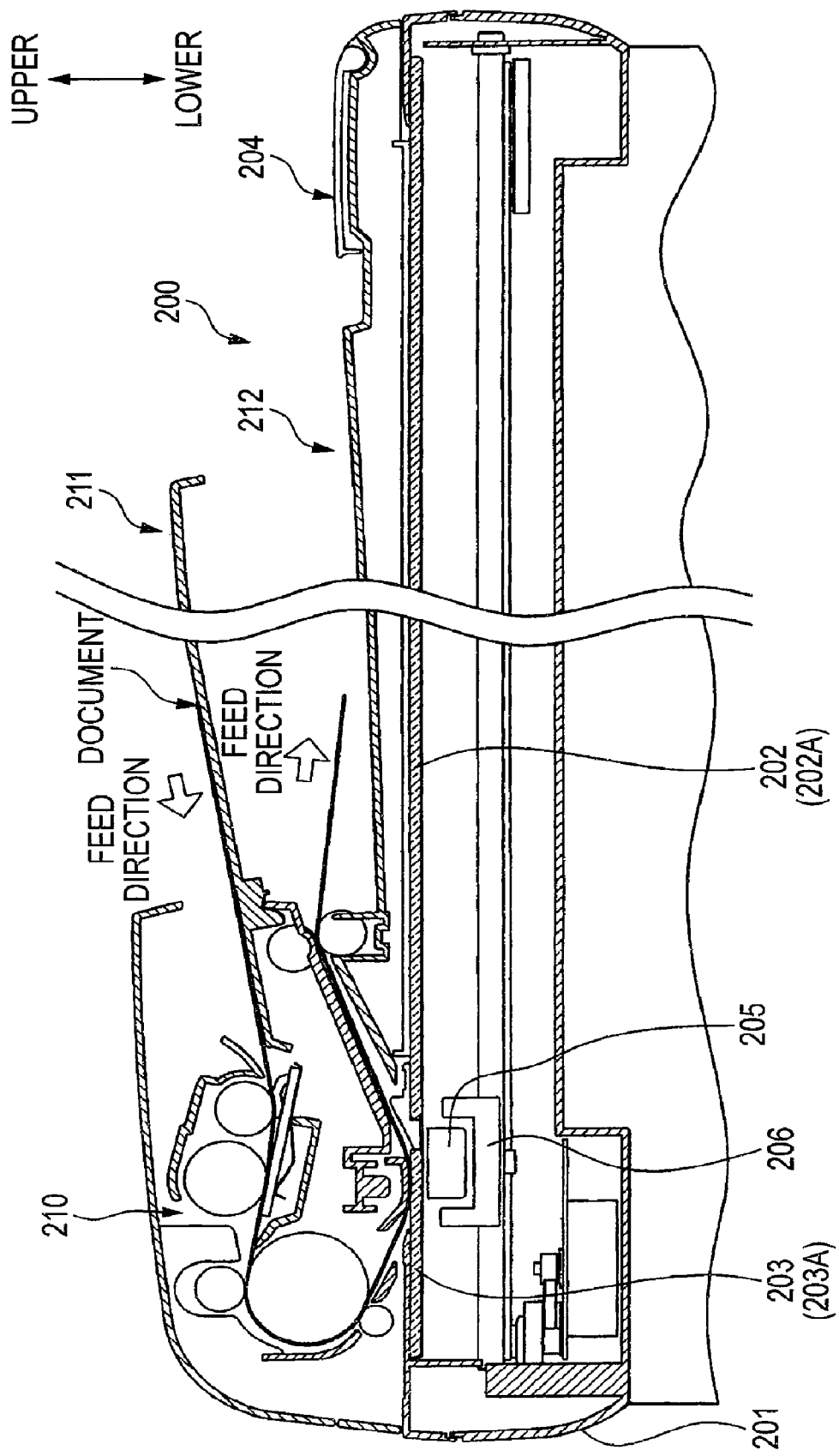

IMAGE FORMING APPARATUS HAVING TWO FRONT CURVED PLANES ONE HAVING RADIUS CURVATURE LARGER THAN THE OTHER

CROSS-REFERENCE TO RELATED APPLICATIONS

This application is based upon and claims the benefit of priority from Japanese Patent Application No. 2006-227951, filed on Aug. 24, 2006, the entire contents of which are incorporated herein by reference.

TECHNICAL FIELD

The present invention is related to an image forming apparatus.

BACKGROUND

JP-A-2004-212494 discloses an image forming apparatus including a printer unit and a scanner unit provided on an upper side of the printer unit. An ejection space is provided between the printer unit and the scanner unit, while recording sheets such as recording paper ejected from the printer unit are placed in the ejection space. As a result, the image forming apparatus with reduced size and improved design can be provided.

SUMMARY

However, users have desired an image forming apparatus with improved usability in addition to the reduction of size and the improvements in the design.

One aspect of the present invention has been made to consider the above-described needs, and has an object to provide an image forming apparatus with improved usability.

According to an aspect of the invention, there is provided an image forming apparatus including: a printer unit that forms an image on a recording sheet; an operation panel for operating and/or setting the printer unit, a side on which the operation panel is provided is defined as a front side; and an ejection space on which the recording sheet ejected from the printer unit is placed, wherein, as viewed from the front side, a radius curvature of a first portion that intermediates a right side plane of the printer unit and a front plane of the printer unit is larger than a radius curvature of a second portion that intermediates a left side plane of the printer unit and the front plane of the printer unit.

BRIEF DESCRIPTION OF THE DRAWINGS

FIG. 9 is a sectional view showing the scanner unit 200 according to the illustrative aspect of the present invention.

DESCRIPTION

1. Outer Structure of Image Forming Apparatus 1

Figure 1:
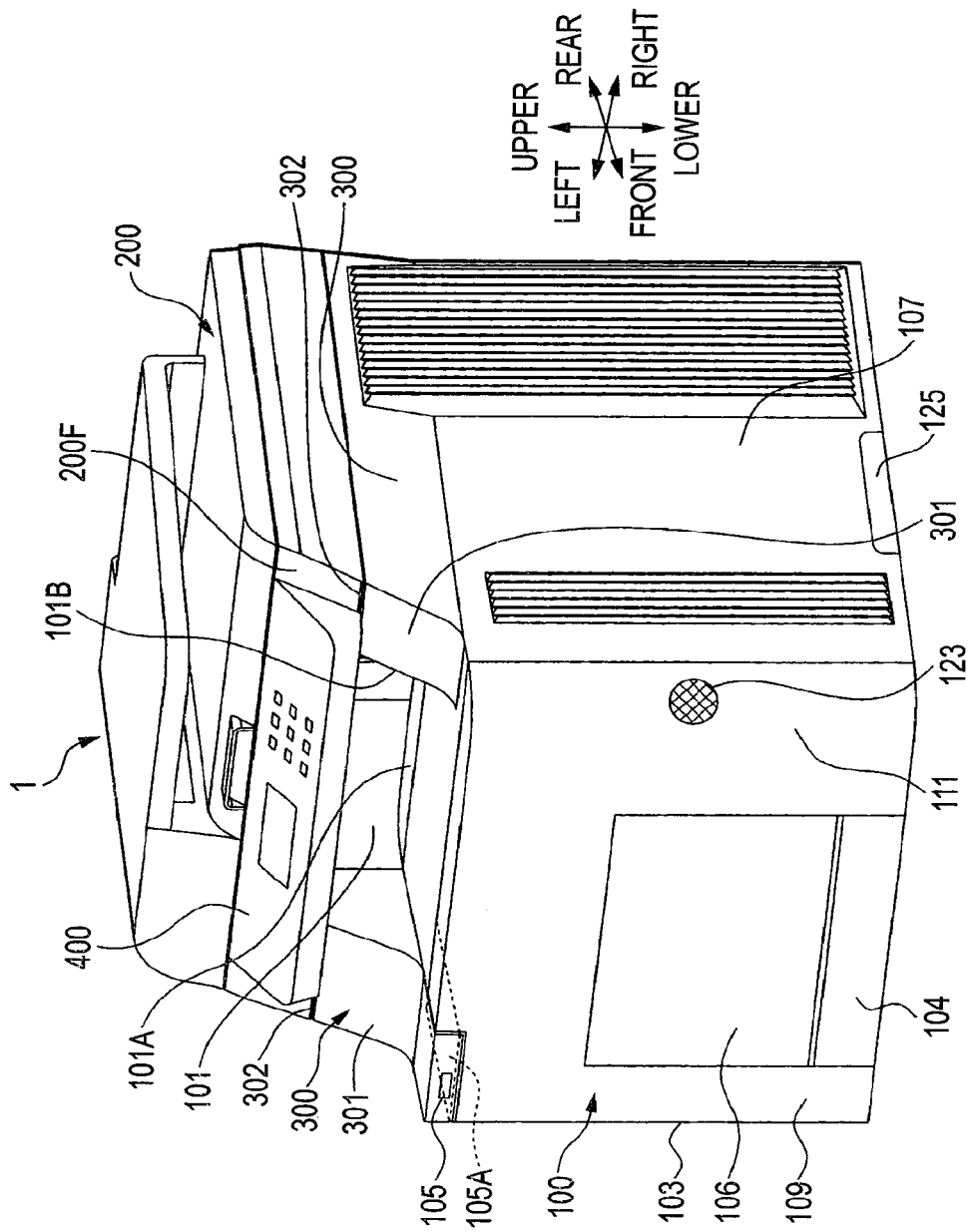
FIG. 1 is a perspective view showing an outer appearance of an image forming apparatus 1 according to an illustrative aspect of the present invention.

As shown in FIG. 1, the image forming apparatus 1 according to an illustrative aspect of the invention includes an electrophotographic printer unit 100, a scanner unit 200 and a pillar portion 300. The printer unit 100 forms an image on a recording sheet such as recording paper and an OHP (Over Head Paper) sheet. The scanner unit 200 reads an image of a document and is arranged via the pillar portion 300 in a predetermined interval on an upper side of the printer unit 100.

An ejection space 101 on which a recording sheet ejected from the printer unit 100 is placed is provided between the printer unit 100 and the scanner unit 200. A bottom portion 101A of the ejection space 101 functions as a paper ejection tray. In this illustrative aspect, the bottom portion 101A of the ejection space 101 will also be referred to as a paper ejection tray 101A.

Then, an operation panel 400 for operating and setting both the scanner unit 200 and the printer unit 100 is provided at a portion in the scanner unit 200, which corresponds to an upper portion of an opening portion 101B of the ejection space 101. In the image forming apparatus 1 of the illustrative aspect, the side where the operation panel 400 is provided is used as a front side thereof.

In this illustrative aspect, a right side directed when the image forming apparatus 1 is viewed from the front side will be referred to as a "right side" of the image forming apparatus 1 (printer unit 100 and scanner unit 200), whereas a left side directed when the image forming apparatus 1 is viewed from the front side will be referred to as a "left side" of the image forming apparatus 1 (printer unit 100 and scanner unit 200).

In the image forming apparatus 1 according to the illustrative aspect, the ejection space 101 has the opening portion 101B which is opened toward the front plane side, and the operation panel 400 is provided on the upper side of the ejection space 101 and the front side of the image forming apparatus 1.

Figure 7:
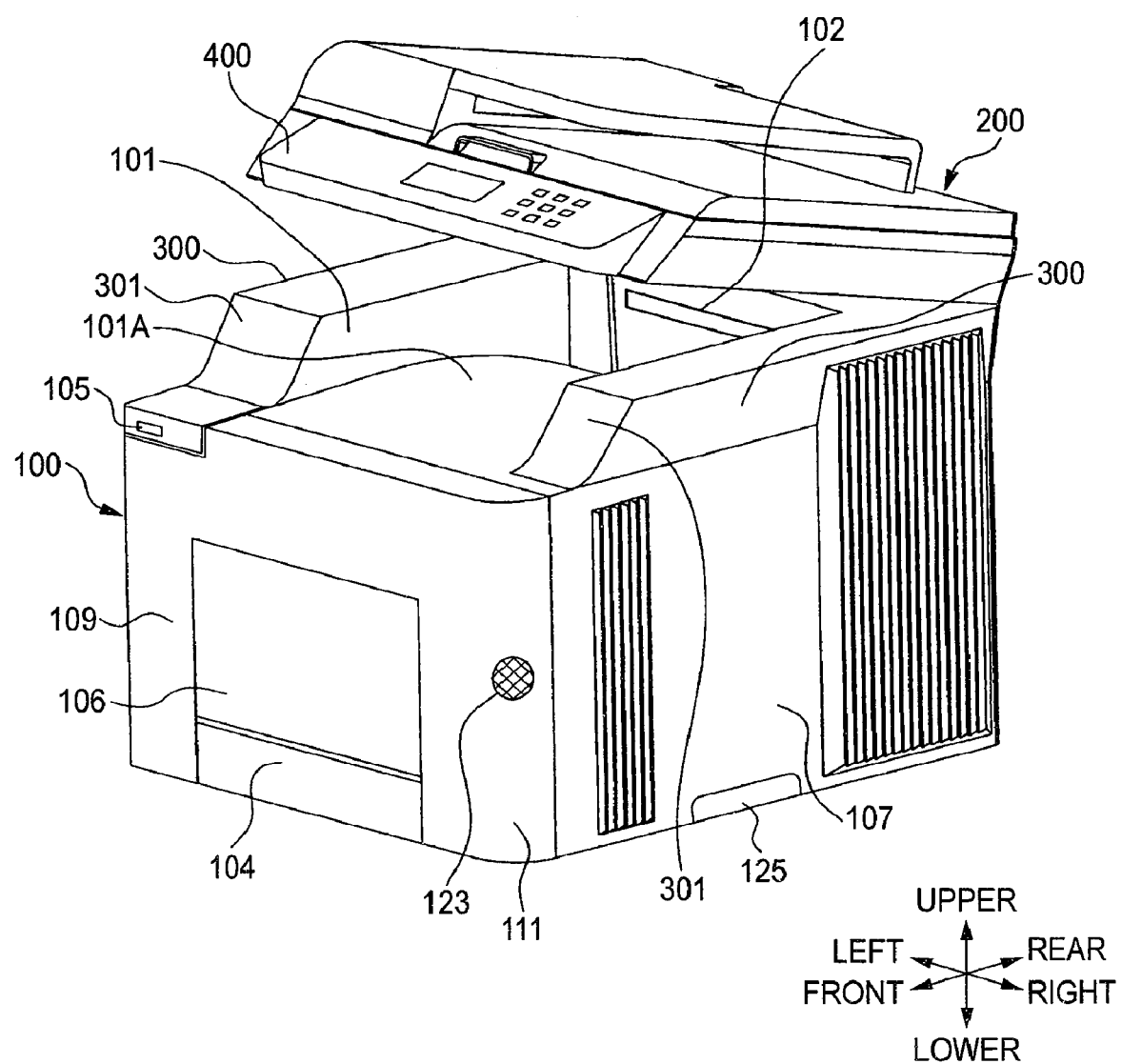
FIG. 7 is a perspective view showing a condition that the scanner unit 200 is opened in the image forming apparatus 1 according to the illustrative aspect of the present invention.
Figure 8:
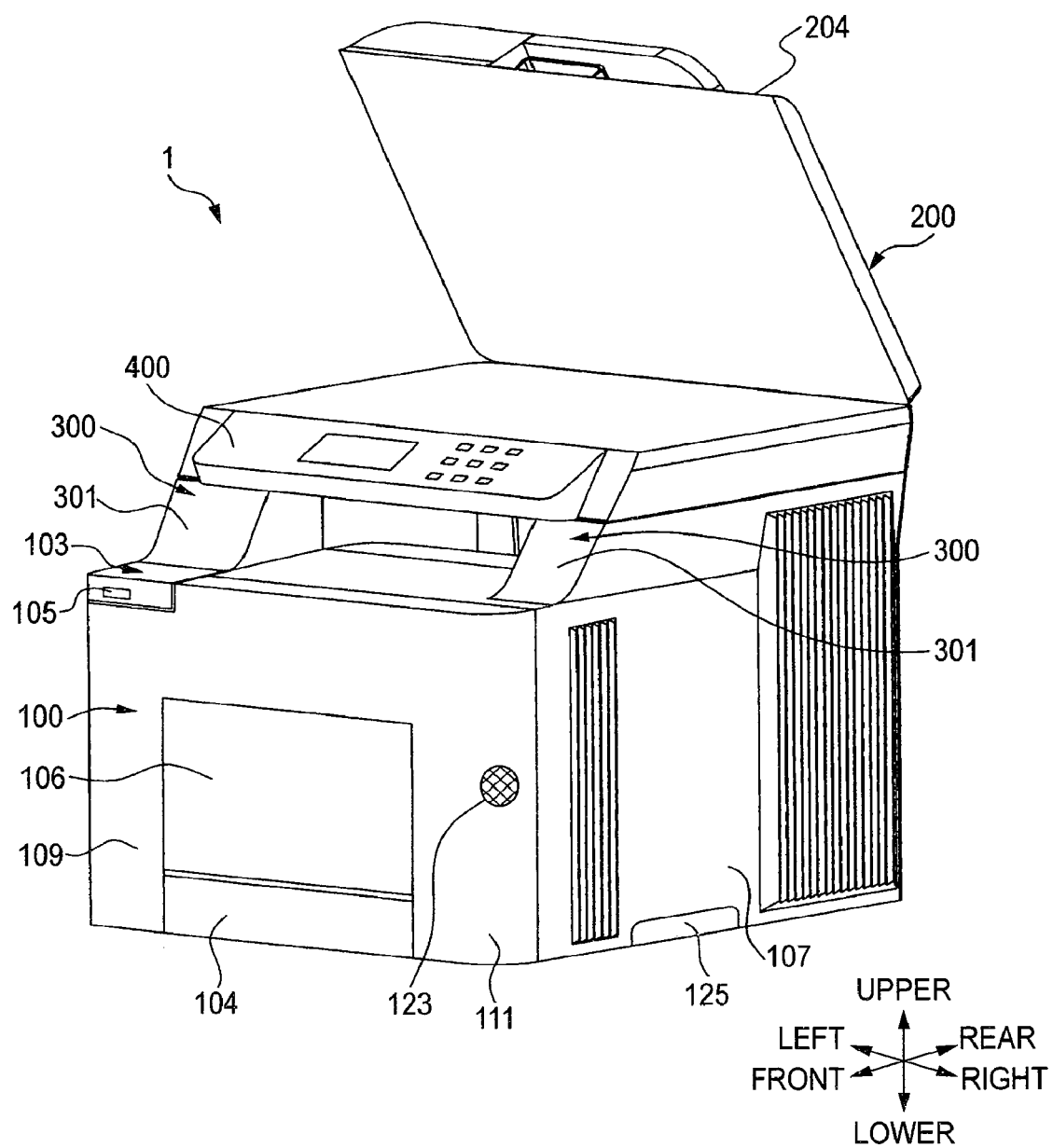
FIG. 8 is a perspective view showing such a condition that the scanner cover 204 is opened in the image forming apparatus 1 according to the illustrative aspect of the present invention.

As shown in FIG. 7, the pillar portion 300 is formed in a substantially horseshoe shape so that a front side of the ejection space 101 is opened and the other three sides thereof are surrounded. The scanner unit 200 is swingably assembled at a portion of the pillar portion 300 on the rear side via a hinge mechanism (not shown).

As shown in FIG. 7, an ejection port 102 is provided at the rear side portion of the pillar portion 300 of the substantially horseshoe shape. A recording sheet with an image having been formed by the printer unit 100 is ejected from the ejection port 102. As a result, when the scanner unit 200 is opened, the ejection port 102 is visible.

The pillar portion 300 includes an inclined plane 301 downwardly inclined forward. A boundary line 302 between the scanner unit 200 and the pillar portion 300 is positioned on this inclined plane 301. Also, the scanner unit 200 includes a front plane 200F downwardly inclined forward. The inclined plane 301 is substantially flush with the front plane 200F when the scanner unit is a closed position. (see FIG. 1).

Figure 2:
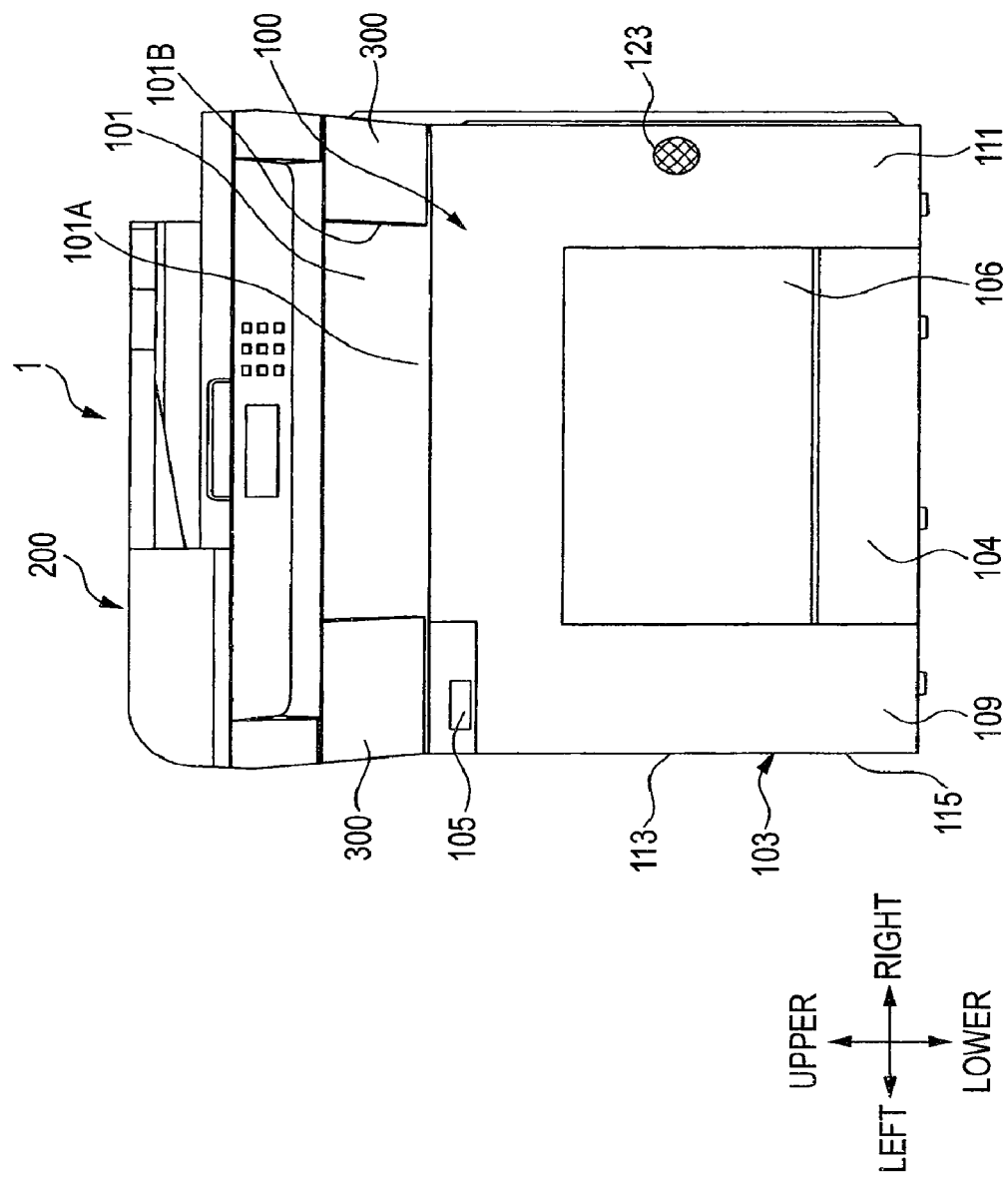
FIG. 2 is a front view of the image forming apparatus 1 according to the illustrative aspect of the present invention.
Figure 3:
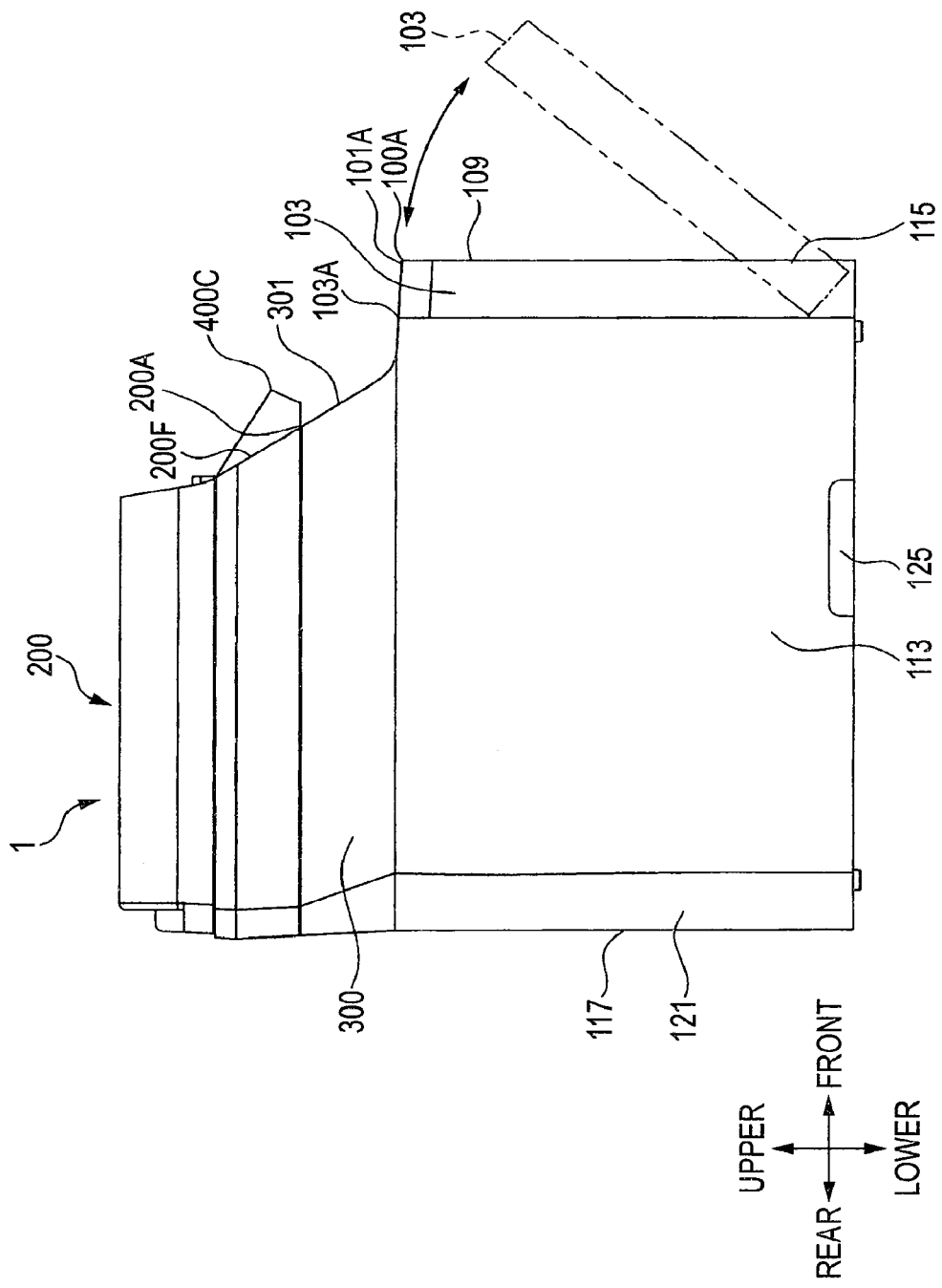
FIG. 3 is a left side view of the image forming apparatus 1 according to the illustrative aspect of the present invention.
Figure 4:
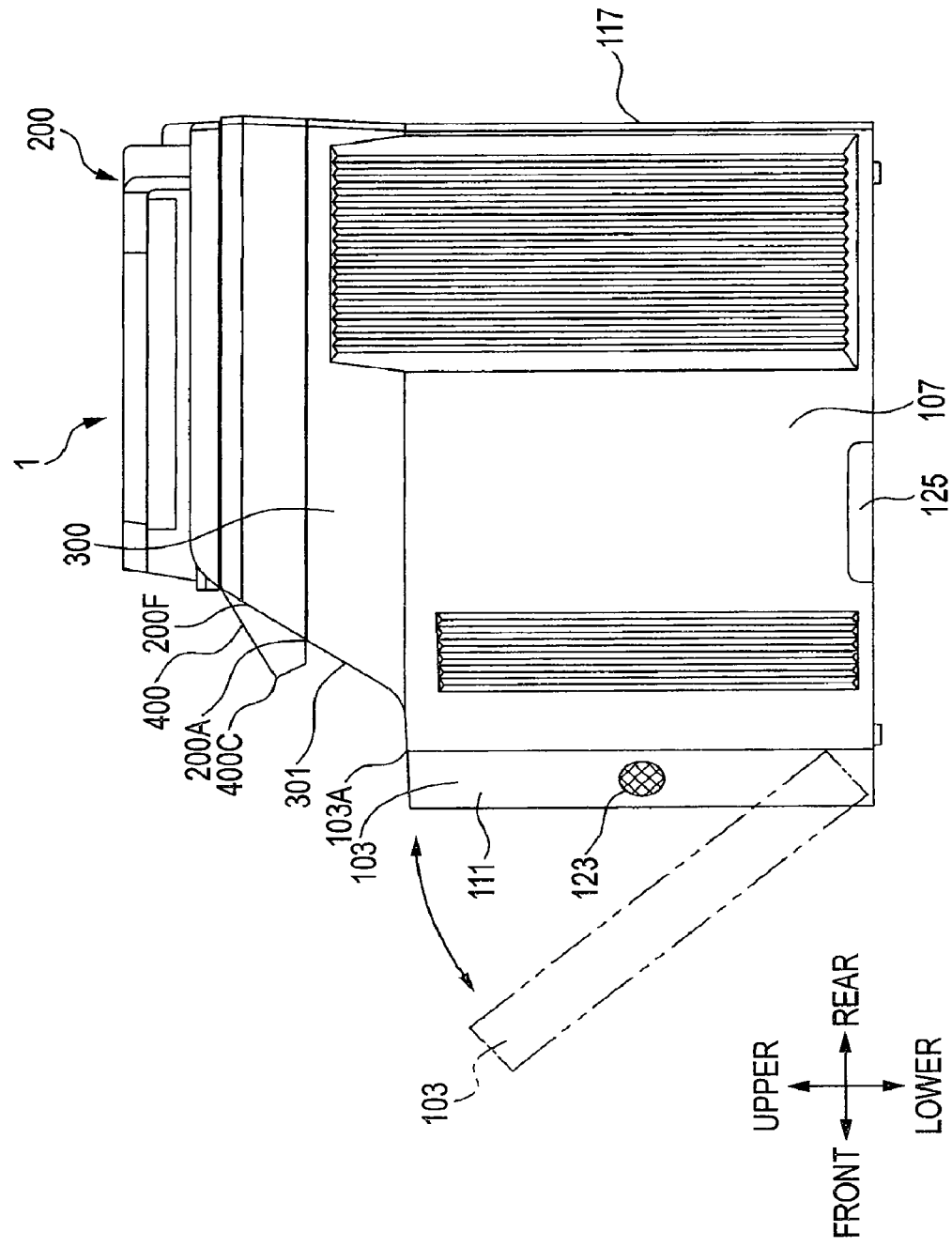
FIG. 4 is a right side view of the image forming apparatus 1 according to the illustrative aspect of the present invention.

As shown in FIG. 1 and FIG. 2, a door 103, a paper feed tray 104, and a multi-purpose tray 106 are provided on the front side of the printer unit 100. The door 103 opens and closes the front side of the printer unit 100. As shown in FIG. 3 and FIG. 4, the door 103 is opened by falling forward. As a result, an image forming unit contained in the printer unit 100, such as a process cartridge (not shown), can be detachably mounted.

The paper feed tray 104 places thereon a recording sheet to be fed into the above-described image forming unit. The paper feed tray 104 is slidably (namely, movable in parallel) installed along the front/rear direction so that the paper feed tray 104 is drawn out from the front side.

As shown in FIG. 1 and FIG. 2, the multi-purpose paper tray 106 is pivotally and swingably supported to the door 103 and capable of falling forward. This multi-purpose tray 106 corresponds to a so-called "manual feed tray" which is used for a case where a printing operation is performed on a paper different from the paper placed on the paper feed tray 104.

A front edge portion 200A of the scanner unit 200 is located on the rear side with respect to a front edge portion 101A of the printer unit 100. A front edge portion 400C of the operation panel 400 is positioned on the rear side with respect to a rear edge portion 103A of the door 103.

Figure 5:
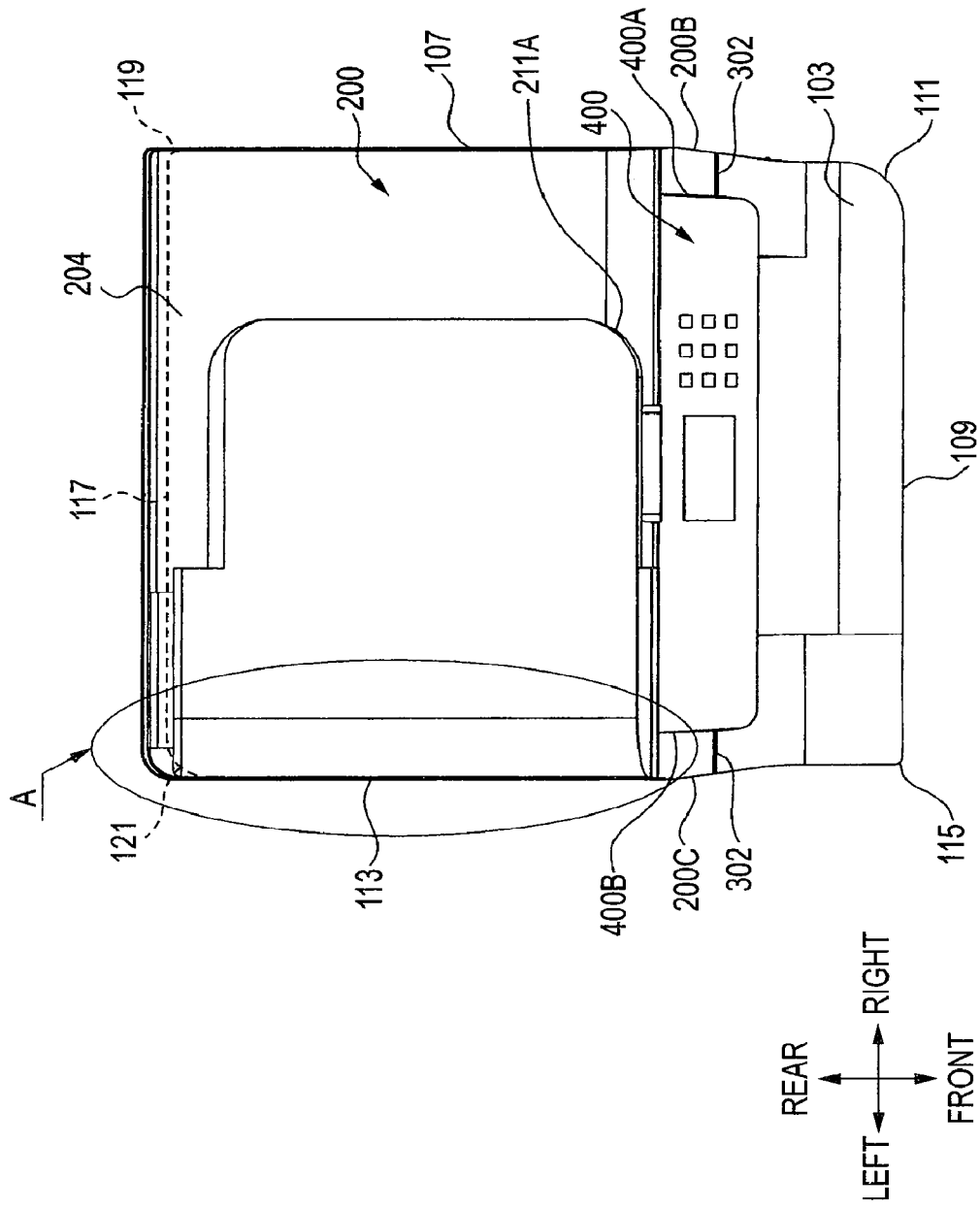
FIG. 5 is an upper view of the image forming apparatus 1 according to the illustrative aspect of the present invention.
Figure 6:
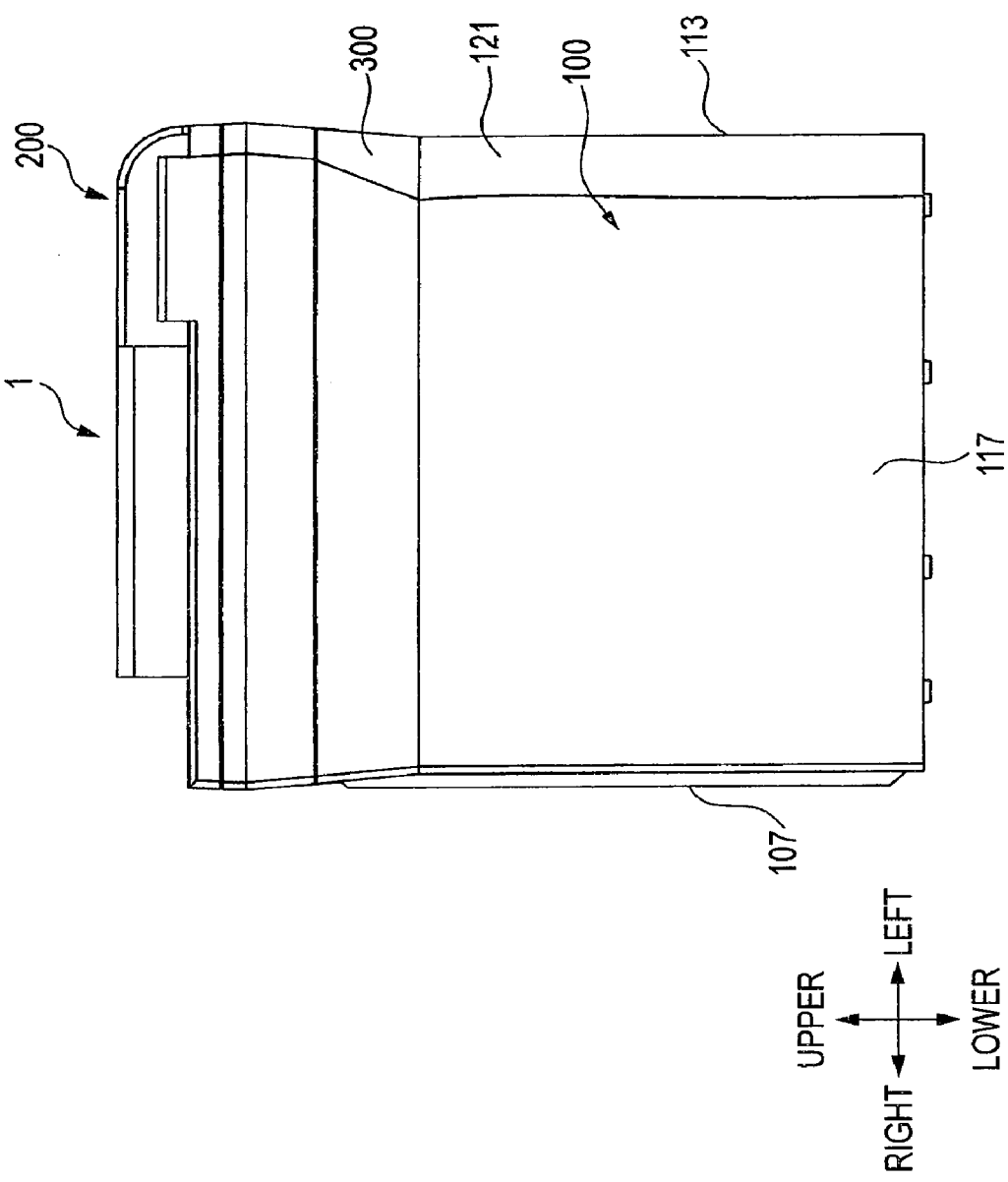
FIG. 6 is a rear view of the image forming apparatus 1 according to the illustrative aspect of the present invention.

As shown in FIG. 5, a right edge portion 400A of the operation panel 400 is positioned on the left side with respect to the right edge portion 200B of the scanner unit 200. A left edge portion 400B of the operation panel 400 is positioned on the right side with respect to the left edge portion 200C of the scanner unit 200.

As shown in FIG. 2, a connecting terminal 105 is provided on an upper left side of the printer unit 100. The connecting terminal 105 is provided on a board 105A and allows an external device (not shown) such as a USB (Universal Serial Bus) terminal to be connected.

A portion 111 (which will be referred to as "front right curved plane 111" hereinafter) intermediates between a right side plane 107 of the printer unit 100 and a front plane 109 of the printer unit 100. A portion 115 (which will be referred to as "front left curved plane 115" hereinafter) intermediates between a left side plane 113 of the printer unit 100 and the front plane 109 of the printer unit 100. A portion 119 (which will be referred to as "rear right curved plane 119" hereinafter) intermediates between the right side plane 107 of the printer unit 100 and a rear plane 117 of the printer unit 100. A portion 121 (which will be referred to as "rear left curved plane 121" hereinafter) intermediates between the left side plane 113 of the printer unit 100 and the rear plane 117 of the printer unit 100. The front right curved plane 111, the front left curved plane 115, the rear right curved plane 119 and the rear left curved plane 121 are formed in curved plane shapes and are rounded.

In this illustrative aspect, a radius curvature of the front right curved plane 111 is set to become larger than a radius curvature of the front left curved plane 115, and also, a radius curvature of the rear left curved plane 121 is set to become larger than a radius curvature of the rear right curved plane 119. As shown in FIG. 1, an air duct port 123 which communicates an interior portion of the printer unit 100 with an exterior portion thereof is provided in the front left curved plane 111. Specifically, the radius curvatures of the front right curved plane 111 and of the rear left curved plane 121 are set to 40 mm, whereas the radius curvatures of the front left curved plane 115 and the rear right curved plane 119 are set to 5 mm.

A grip portion 125 used to grip the image forming apparatus 1 is provided on the lower edge portions of both the right side plane 107 and the left side plane 113 of the printer unit 100. This grip portion 125 includes concave portions which are sunken to the inner side of the printer unit 100.

In the illustrative aspect, the paper ejection tray 101A and the front plane 109 of the printer unit 100 are colored so that brightness of the paper ejection tray 101A becomes darker than that of the front plane 109 of the printer unit 100. Furthermore, the operation panel 400, the paper ejection tray 101A, and the pillar portion 300 are colored so that brightness of the operation panel 400 and the paper ejection tray 101A becomes darker than that of the pillar portion 300.

Specifically, the brightness of the front plane 109 of the printer unit 100 is approximately 8 in the Munsell value; the brightness of the paper ejection tray 101A is approximately 2 in the Munsell value; the brightness of the operation panel 400 is approximately 2 in the Munsell value; and the brightness of the pillar portion 300 is approximately 8 in the Munsell value.

It should also be noted that a Munsell value corresponds to a value defined based upon a Munsell chroma. As to a Munsell value related to brightness, the larger the Munsell value is increased, the lighter the brightness becomes, whereas the smaller the Munsell value is decreased, the darker, the brightness becomes.

2. Schematic Structure of Image Reading Apparatus (Refer to FIG. 9)

As represented in FIG. 9, an image reading window 202 for a still document reading function (will be referred to as "still reading window" hereinafter), and an image reading window 203 for an automatic feeding/reading function (will be referred to as "automatic reading window" hereinafter) are provided on a main body unit 201 of the scanner unit 200. Both the reading windows 202 and 203 are blocked by transparent platens 202A and 203A such as glass and acrylic resins.

Also, a scanner cover 204 is swingably assembled on the upper plane side of the main body unit 201, while the scanner cover 204 covers both the reading windows 202 and 203. In order to a document is read out via the still reading window 202, this scanner cover 204 is manually opened to the upper side, and then, the document is placed on the still reading window 202.

An imaging element 205 is arranged within the main body unit 201. The imaging element 205 receives light irradiated onto and reflected from the document and produces an electric signal based upon the received light. The scanner unit 200 converts an image such as a character written on the document into an electric signal so as to read the image via the imaging element 205.

For instance, in the illustrative aspect, as the imaging element 205, a CIS (Contact Image Sensor) is employed. A longitudinal direction of this CIS (imaging element 205) is extended along a direction perpendicular to a feeding direction thereof (namely, a direction perpendicular to the paper plane of the drawing) just under both the reading windows 202 and 203.

The imaging element 205 performs a scanning operation along the longitudinal direction of the main body unit 201 via a carriage 206, namely along the left/right direction of the image forming apparatus 1. When the image forming apparatus 1 is operated in the automatic feeding/reading function, the imaging element 205 reads an image under a condition that the imaging element 205 is stopped and arranged just under the automatic reading window 203. On the other hand, when the image forming apparatus 1 is operated in the still document reading function, while the imaging element 205 is fed just under the still reading window 202, the imaging element 205 reads an image from a scanning start position set to a left side of a paper plane of the drawing toward a right side of the paper plane of the drawing.

An automatic document feeding mechanism 210 (namely, automatic document feeder) is provided in the scanner cover and at and in the vicinity of a portion corresponding to the automatic reading window 203. The automatic document feeding mechanism 210 feeds a document which should be read to the automatic reading window 203.

It should also be understood that a document tray 211 serves as a placing unit used to place thereon documents for automatic reading. The documents stacked and placed on the document tray 211 are fed to the automatic reading window 203 by the automatic document feeding mechanism 210, and thereafter, the fed documents are ejected to the ejection tray 212 so as to be placed thereon.

As shown in FIG. 5, a right-sided corner portion 211A of the document tray 211 as viewed from the front plane side is made round, while the corner portion 211A is located on the front side but opposite side of the automatic document feeding mechanism 210. Brightness of a portion (namely, portion "A" of FIG. 5) of the scanner cover 204 is set to become dark, as compared with the brightness of the other portion of the scanner cover 204. The portion "A" corresponds to scanning start positions of both the document tray 211 and the imaging element 205.

Specifically, a Munsell value of the left-sided portion of the scanner cover 204 such as the portion "A" of FIG. 5 and the document tray 211 is set to be smaller than or equal to 5 (namely, 3 in the illustrative aspect), a Munsell value of the other portion (right-sided portion of scanner cover 204) is set to be larger than 5 (namely, 8 in the illustrative aspect).

3. Features of Image Forming Apparatus According To Illustrative Aspect

When a right hand of a user is moved to the side of the operation panel 400 in order to operate the operation panel 400, there are some possibilities that the hand of the user collides with the right corner portion of the printer unit 100. However, in accordance with the illustrative aspect, the radius curvature of the front right curved plane 111 is set to be larger than that of the front left curved plane 115. As a result, it is possible to suppress that the hand of the user collides with the right corner portion of the printer unit 100. Even if the hand of the user collides with the right corner portion of the printer unit 100, then shocks (pains) occurred in this collision can be reduced.

Also, in the illustrative aspect, the front edge portion 200A of the scanner unit 200 is positioned on the rear side with respect to the front edge portion 100A of the printer unit 100, and further, the front edge portion 400C of this operation panel 400 is positioned on the rear side with respect to the rear edge portion of the door 103. As a result, the user can visually recognize the opening portion 101B of the ejection space 101 from the upper oblique side.

As a consequence, the recording sheets ejected to the ejection space 101 can be easily taken out, and when the recording sheets are taken out from the ejection space 101, it is possible to suppress that the hand of the user collides with the operation panel 400. Furthermore, when the door 103 is opened/closed, the operability of the operation panel 400 can be improved while opening/closing of the door 103 are not interrupted by the operation panel 400.

Also, in the illustrative aspect, the connecting terminal 105 is provided on the left side of the printer unit 100, as viewed from the front plane side. As a result, the connecting terminal 105 is mounted at the relatively sharp corner portion whose radius curvature is small, which is located on the left side of the image forming apparatus 1, and even when the user uses the user's right hand, the user's right hand can hardly collide with the connecting terminal 105. As a consequence, as compared with a case where the connecting terminal 105 is mounted on a rounded corner portion whose radius curvature is larger, it is possible to prevent the device connected to the connecting terminal 105 and the connecting terminal 105 from being damaged by the manipulations by the right hand of the user. In addition, this can readily secure the space within the printer unit 100 for mounting the rectangular-shaped board 105A which mounts thereon the connecting terminal 105.

In the illustrative aspect, the front plane side of the pillar portion 300 is inclined, and furthermore, the boundary line 302 between the scanner unit 200 and the pillar portion 300 is positioned on the inclined plane 301 and the front plane 200F of the scanner unit 200. As a result, the user swingably moves the scanner unit 200 to open the ejection space 101, so that the user can readily take out relatively small recording sheets such as post cards ejected to the ejection space 101. The front plane 200F of the scanner unit 200 may not be inclined and/or flush with the inclined plane 301, as long as the user can visually recognize the boundary line 302 from the upper and/or front side.

Then, since the boundary line 302 between the scanner unit 200 and the pillar portion 300 is located on the inclined plane 301 and the inclined plane 200F, when the user swingably moves the scanner unit 200 to open the ejection space 101, the user can visually recognize the boundary line 302 from the upper side.

Also, in the illustrative aspect, the corner portion 211A of the document tray 211 on the right side as viewed from the front plane side is made round, while the corner portion 211A is located on the front side but the opposite side of the automatic document feeding mechanism 210. As a result, in the case that a document is placed on the document tray 211 and a document is taken out from the ejection tray 212, it is possible to avoid that the hand of the user collides with the corner of the document tray 211. Even if the hand of the user collides with the corner of the document tray 211, shocks (pains) occurred in this collision can be reduced.

When the image forming apparatus 1 is installed to be closely contacted to a wall, the air duct ports such as an air exhaust port and an air in-take port, which are formed in the image forming apparatus 1, are blocked up by the wall. As a result, the interior portion of the image forming apparatus 1 cannot be exhausted (cooled).

In contrast thereto, in the illustrative aspect, since the air duct port 123 is formed in the front right curved plane 111, even when the image forming apparatus 1 is installed to be closely contacted to the wall, a gap may be produced between the wall and the front right curved plane 111. As a result, air can be ventilated through the air duct port 123, so that the interior portion of the image forming apparatus 1 can be ventilated (cooled).

Also, in the illustrative aspect, the right edge portion 400A of the operation panel 400 is located on the left side from the right edge portion 200B of the scanner unit 200, and further, the left edge portion 400B of the operation panel 400 is located on the right side from the left edge portion 200C of the scanner unit 200. As a result, when the user moves the user's hand to the side of the operation panel 400 in order to operate the operation panel 400, it is possible to suppress that the user's hand of the user collides with the operation panel 400.

Brightness of a recording sheet is normally larger than or equal to 9 (in unit of Munsell value), namely becomes bright, and moreover, the brightness of the front plane 109 of the printer unit 100 is approximated to the above-described brightness of the recording sheet. As a consequence, as described in the illustrative aspect, if the brightness of the paper ejection tray 101A is made darker than the brightness of the front plane 109 of the printer unit 100, then recording sheets may become conspicuous, so that the recording sheets ejected on the paper ejection tray 101A can be easily found out.

Also, in the illustrative aspect, the brightness of the front plane 109 of the printer unit 100 is approximated to the brightness of the pillar portion 300, and furthermore, the brightness of both the operation panel 400 and the paper ejection tray 101A is darker than the brightness of the pillar portion 300. As a consequence, the recording sheets ejected on the paper ejection tray 101A can be easily found out.

In a scanning start position (home position) of the imaging element 205, a confirmation operation of the scanning start position and a confirmation operation of a white reference are carried out. If light is entered into the still reading window 202 when this confirmation operation is carried out, then an adverse influence is given to the confirmation operations.

To the contrary, in the illustrative aspect, the brightness of the portion (portion "A" of FIG. 5) corresponding to the scanning start portion of both the document tray 211 and the imaging element 205 is set to be darker than the brightness of the other portion. As a result, the light which penetrates the scanner cover 204 and then reaches the still reading window 202 can be effectively cut off. As a consequence, it is possible to suppress that the light is entered into the still reading window 202 when this confirmation operation is carried out. As a result, it is possible to suppress that the adverse influence is given to the confirmation operations.

Other Illustrative Aspects

Although the CIS is employed as the imaging element 205 in the above-described illustrative aspect, the present invention is not limited only to this CIS. Alternatively, for instance, a CCD (Change-Coupled Device) may be employed.

Also, although the scanner unit 200 according to the above-described illustrative aspect has both the still document reading function and the automatic feeding/reading function, the present invention is not limited only thereto. Alternatively, the scanner unit 200 may have any one of the still document reading function and the automatic feeding/reading function.

Also, although the scanner unit 200 is swingably attached on the rear side of the portion of the pillar portion 300 via the hinge mechanism in the above-described illustrative aspect, the present invention is not limited only thereto. Alternatively, for example, the scanner unit 200 may be swingably attached to any portion other than the pillar portion 300. Otherwise, the scanning unit 200 may be assembled on the pillar portion 300 under without swingable condition.

Also, although the air duct port 123 is formed in the front right curved plane 111 in the above-described illustrative aspect, the present invention is not limited only thereto.

Also, although the electrophotographic type image forming apparatus is applied to the printer unit 100 in the above-described illustrative aspect, the present invention is not limited only thereto. Alternatively, an ink jet type image forming apparatus may be applied to the printer unit 100.

Also, although the USB terminal is provided as the connecting terminal 105 in the above-explained illustrative aspect, the present invention is not limited only thereto.

Furthermore, the present invention is not limited only to the above-described illustrative aspects but various changes and modification may be made without departing from the scope of the present invention.

What is claimed is:

1. An image forming apparatus comprising:
   a printer unit configured to form an image on a recording sheet; and
   an operation panel configured to receive input for operating and/or setting the printer unit, a side on which the operation panel is provided being defined as a front side,
   wherein, as viewed from the front side, a radius curvature of a first portion that intermediates a right side plane of the printer unit and a front plane of the printer unit is larger than a radius curvature of a second portion that intermediates a left side plane of the printer unit and the front plane of the printer unit.

2. The image forming apparatus according to claim 1, further comprising:
   a pillar portion provided on the printer unit; and
   a scanner unit provided on the pillar portion,
   wherein the printer unit, the pillar portion and the scanner unit define an ejection portion on which the recording sheet ejected from the printer unit is configured to be placed, the ejection portion is between the printer unit and the scanner unit and has an opening portion at least on the front side.

3. The image forming apparatus according to claim 2,
   wherein the printer unit includes a door provided on the front side of the printer unit configured to be opened and closed,
   wherein a front edge portion of the scanner unit is positioned on a rear side with respect to a front edge portion of the printer unit, and
   wherein a front edge portion of the operation panel is positioned on a rear side with respect to a rear edge portion of the door.

4. The image forming apparatus according to claim 2,
   wherein a first inclined plane downwardly inclined forward is formed on the front side of the pillar portion;
   wherein the scanner unit is swingably attached to the pillar portion so that an upper side of the ejection portion is configured to be selectively opened or closed; and
   wherein a boundary line between the scanner unit and the pillar portion is positioned on a boundary plane.

5. The image forming apparatus according to claim 4, wherein a second inclined plane downwardly inclined forward is formed on the front side of the scanner portion, and
   wherein the boundary line is positioned between the first inclined plane and the second inclined plane.

6. The image forming apparatus according to claim 5, wherein the first inclined plane is substantially flush with the second inclined plane.

7. The image forming apparatus according to claim 4,
   wherein the operation panel is arranged on an upper portion of the opening portion of the ejection portion, and
   wherein brightness of the operation panel and brightness of a bottom portion of the ejection portion are darker than brightness of the pillar portion.

8. The image forming apparatus according to claim 2, wherein the scanner unit comprises:
   a reading unit configured to read a document;

an automatic document feeding mechanism configured to automatically feed the document to the document reading unit; and a document tray on which the document fed by the automatic document feeding mechanism is placed, wherein a corner portion on the front and right side of the document tray is round, as viewed from the front side.

9. The image forming apparatus according to claim 2, wherein the operation panel is integrally formed to the scanner unit, wherein a right edge portion of the operation panel is positioned at a left side with respect to a right edge portion of the scanner unit as viewed from the front side, and wherein a left edge portion of the operation panel is positioned at a right side with respect to the left edge portion of the scanner unit as viewed from the front side.

10. The image forming apparatus according to claim 2, wherein the scanner unit comprises:

a reading window on which a document is placed;

an imaging element that is provided below the reading window and is configured to perform a scanning operation along a right/left direction as viewed from the front side; and a scanner cover that covers the reading window, the scanner cover including a first cover portion corresponding to and in a vicinity of a scanning start position of the imaging element and a second cover portion other than the first cover portion, wherein brightness of the first cover portion is darker than brightness of the second cover portion.

11. The image forming apparatus according to claim 1, further comprising a connecting terminal provided on the front and left side of the printer unit, as viewed from the front plane side thereof, to allow an external device to be connected.

12. The image forming apparatus according to claim 1, wherein one of portions, each of which intermediates the side plane of the printer unit and either the front or rear plane of the printer unit, is formed in a curved shape, and wherein an air duct port that communicates an interior portion of the printer unit with an exterior portion thereof is provided in the portion formed in the curved shape.

13. The image forming apparatus according to claim 1, wherein brightness of a bottom portion of the ejection portion is darker than brightness of the front plane of the printer unit.

14. The image forming apparatus according to claim 1, further comprising a grip portion provided on a lower portion of the printer unit.

* * * * *